July 26, 1932.   H. WILLSHAW ET AL   1,868,959
MOLD FOR TIRES AND ANNULAR ARTICLES
Filed Dec. 26, 1930
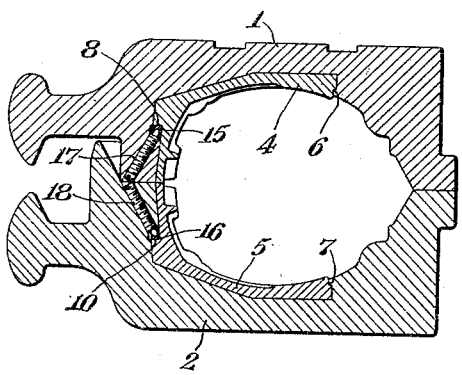
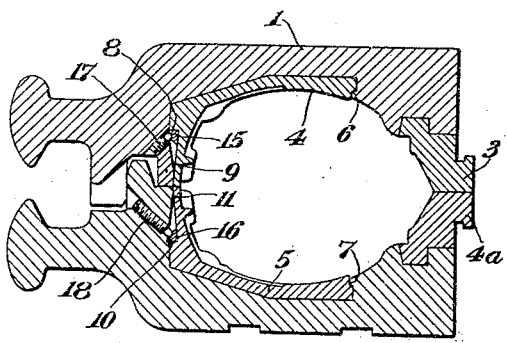
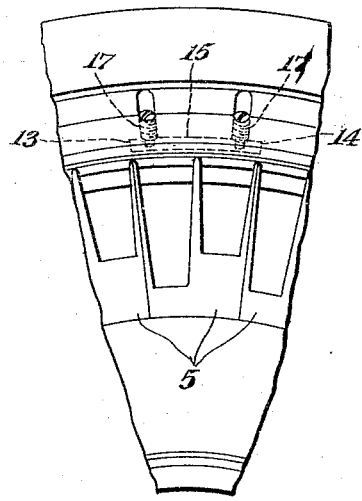
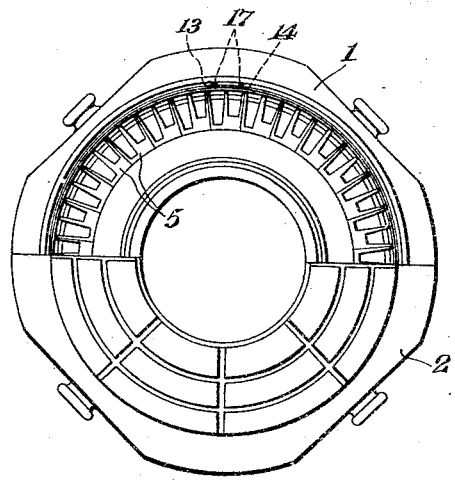
INVENTORS
Harry Willshaw
Thomas Norcross
BY their ATTORNEYS

UNITED STATES PATENT OFFICE

HARRY WILLSHAW AND THOMAS NORCROSS, OF ERDINGTON, BIRMINGHAM, ENGLAND, ASSIGNORS TO DUNLOP TIRE AND RUBBER CORPORATION, OF BUFFALO, NEW YORK, A CORPORATION OF NEW YORK

MOLD FOR TIRES AND ANNULAR ARTICLES

Application filed December 26, 1930, Serial No. 504,736, and in Great Britain January 23, 1930.

This invention concerns improvements in or relating to molds for tires and annular articles and particularly relates to molds of the kind comprising two complementary outer members each containing a recess for detachable inserts.

The formation of semi-shells corresponding to the articles to be molded and made of soft metal such as tin, type metal, aluminum, or of hard metal such as steel, is well known, such shells when of soft metal being die cast so that the soft metal is swaged and planished, thereby giving a fine finish to the molded article. Such shells have the advantages of easy replacement and economy.

It has also been proposed to form a tire mold with detachable inserts each of which is flanged and attached to one of the outer members by studs passing through the flanges into the outer members.

The object of our invention is to provide an improved mold of the kind referred to, in which the aligning, positioning, and retaining means are of a more positive nature, being an integral part of the mold and in which the insertion and removal of the inserts is a quick and simple operation which may be effected by the insertion or the removal of one member from each outer member for the purpose of locking the inserts in their working positions or permitting their removal by lateral displacement.

Another effect of our invention is to obviate the use of rings previously employed either or both to position the inserts or to distribute the stress due to the suction of the article upon the inserts when the mold is broken, whereas in our construction the ring is not separately provided but is an integral mold feature which cannot be misaligned on re-assembly, and therefore more accurately positions the inserts while affording them the maximum support against the drag consequent upon breaking the mold.

According to this invention we provide a mold for tires and annular articles having two complementary members, the inner surface of each of which is formed with integral shoulders for positioning detachable inserts, the shoulders being discontinuous at one or more places to permit the insertion or removal of the inserts by lateral displacement, and having means for completing the continuity of the shoulders whereby the inserts are permanently retained in position, the said inserts being separately cast or die cast, and preferably composed of aluminum or an alloy thereof, and being positioned so as to extend from the tread towards the inner periphery of the mold, and in which the means for completing the continuity of the shoulders positioning the inserts consists of members carried by one of the inserts which may be molded, cast, or die cast, with patterns or designs over the whole or a part of their surfaces.

In order that our invention may be more easily understood and readily carried into effect the same will now be described with reference to the accompanying drawing, in which:—

Figs. 1 and 2 are cross sections of tire molds;

Fig. 3 is a part plan view to an enlarged scale of the part of the mold containing the insert which completes the ring and closes the slot cut in the shoulders.

Fig. 4 in respect of its uper half is a plan view of one of the molds showing the inserted molding surface 5, and the lower half is an outside view showing the channels permitting the circulation of the heating fluid.

The mold consists of two separable complementary members 1 and 2 which may be provided with separate bead rings 3 and 4a as in Fig. 2.

Within each mold member 1 and 2 are positioned inserts 4 and 5 which may be such as to mold merely the tread, or may extend down the side wall as illustrated to any convenient depth.

Each outer shell is recessed to receive the inserts which are positioned between shoulders which are integral with the mold.

The shoulders 6 and 7 are continuous, the inner edge of each insert in each mold part being positioned by contact with the respective shoulders 6 and 7 formed on the shells.

On the inner surface of each mold member or shell adjacent the tread is provided a second shoulder in each case, the profile of which, excepting at the gap where it is cut away, follows the outline of the integral section inserts 4 and 5 respectively between the points 8 to 9, and 10 to 11 respectively. Figs. 1 and 2 which are cross sections through the gap show how the gap is finally closed.

To fill each annular recess successive inserts are manipulated downwards through the gap, the minimum width of which is shown between the points 13 and 14 in Fig. 3 as equivalent to the width of one insert until the integral shoulders 8 and 10 in the mold members coincide with the corresponding faces of the inserts whereupon the insert is slid round in either direction. Further inserts are then inserted in succession through the same or similar gaps, if more than one, until by lateral displacement the circle of inserts is complete with the exception of the last or key insert.

Each mold part has one key-insert for each gap. The key-insert differs from the remainder only in being formed with or having affixed a false shoulder 15 or 16 of the same width as the insert, which completes the continuity of the integral shoulders interrupted to form the gap and provides an abutment for positioning members two in each mold half, one pair of which are shown at 17 in Fig. 3, the second pair being similarly positioned at 18.

Having now particularly described and ascertained the nature of our said invention and in what manner the same is to be performed, what we claim is:—

1. A mold for tires and annular articles having two complementary members a number of individual inserts, the inner surface of said complementary members being formed with an integral shoulder forming an interlocking retaining groove for positioning and retaining said inserts, the shoulder being discontinuous at one or more places to form a gap permitting inserts to be inserted and moved into engagement with said shoulder, and means to secure a final insert in said gap.

2. A mold for tires according to claim 1 in which the inserts extend from the tread to the inner periphery of the mold.

3. A mold according to claim 1, in which the means for completing the continuity of the shoulder positioning the inserts consists of a member carried by one of the inserts.

4. The mold defined in claim 1, in which the detachable inserts when positioned in said mold form a complete annular mold surface.

5. The mold defined in claim 1, in which the said inserts have a pattern on their mold surfaces.

6. A mold for tires and annular articles having two complementary members, each of said members having an annular recess and annular shoulders at the opposite edges of said recess to form retaining grooves, inserts having back portions to fit into said recess and be retained by said shoulders, and having face portions forming an annular mold surface, the face portions of the inserts and opposite members joining to form a continuous mold surface, one of said shoulders being cut away to permit an insert to be passed therethrough and slid into engagement in said recess, and means for retaining the final key insert in the cut away portion of said shoulder.

In witness whereof we have hereunto set our hands.

HARRY WILLSHAW.
THOMAS NORCROSS.